March 20, 1945. J. H. BOYD, JR 2,371,794
PREPARATION OF CYCLOPENTANONE
Filed Aug. 31, 1942
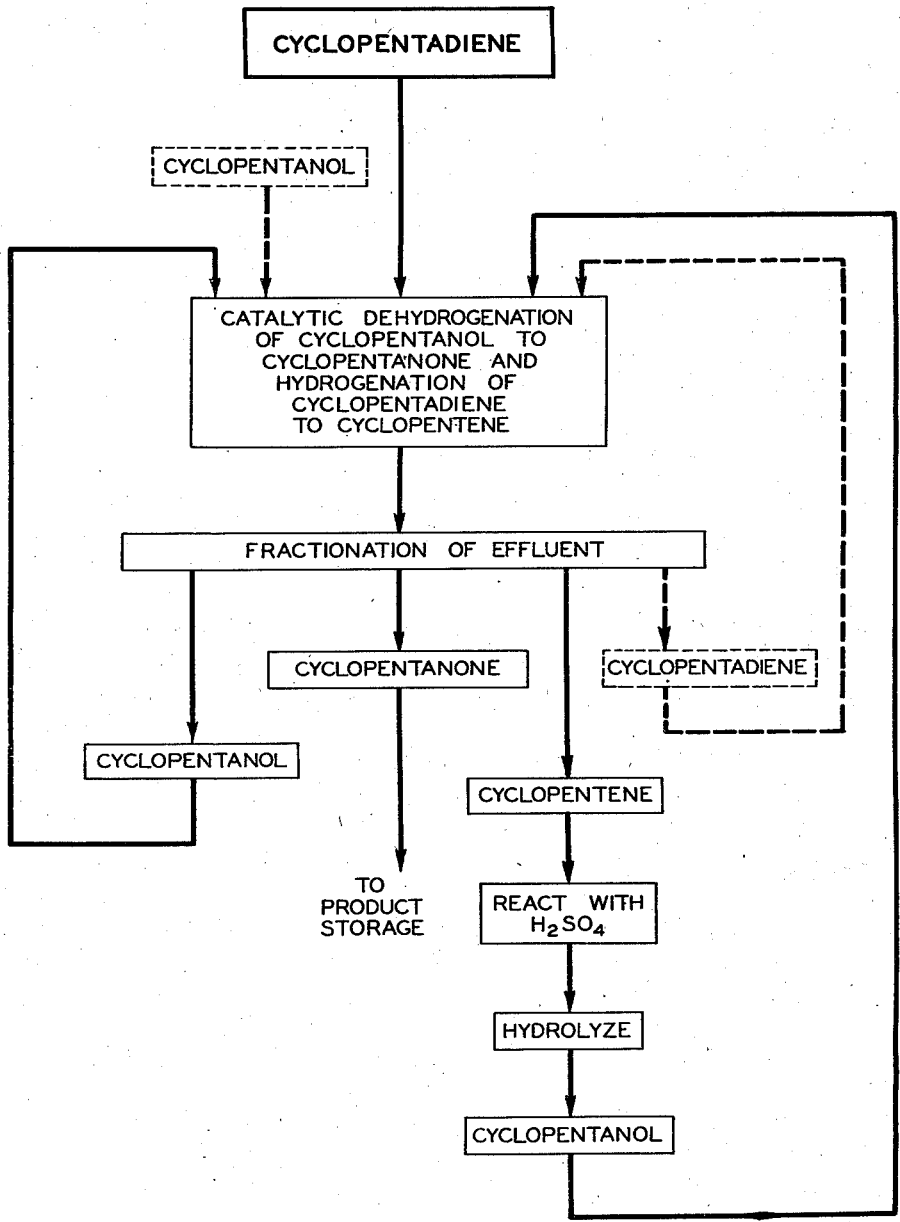
INVENTOR
J. H. BOYD, JR.
BY Hudson, Young & Yinger
ATTORNEYS Patented Mar. 20, 1945

2,371,794

UNITED STATES PATENT OFFICE 2,371,794

PREPARATION OF CYCLOPENTANONE

James H. Boyd, Jr., Hudson Township, Summit County, Ohio, assignor to Phillips Petroleum Company, a corporation of Delaware Application August 31, 1942, Serial No. 456,822

10 Claims. (Cl. 260—586)

This invention relates to the preparation of cyclopentanone and more particularly to the continuous conversion of cyclopentadiene to cyclopentanone by the simultaneous dehydrogenation of cyclopentanol to cyclopentanone and hydrogenation of cyclopentadiene to cyclopentene which is recovered, converted to cyclopentanol and the latter recycled to the dehydrogenation-hydrogenation step.

In the C₅ hydrocarbon stream separated from the effluent of low-pressure petroleum cracking there is a substantial amount of the cyclic diolefin, cyclopentadiene, which at present is not being utilized. Cyclopentadiene is also economically available from other sources. There is very little demand for this compound. Cyclopentanone is now made by distillation of calcium adipate and has great value as an industrial solvent and softener and as an intermediate in organic synthesis.

The principal object of the present invention is to provide an improved method of preparing cyclopentanone. Another object is to convert cyclopentadiene to cyclopentene and subsequently to cyclopentanone. Another object is to carry out this process continuously. Numerous other objects will more fully hereinafter appear.

The accompanying drawing is a self-explanatory flow diagram of the process of the present invention in a preferred embodiment. Optional steps are dotted.

In accordance with my invention, a mixture of cyclopentadiene with cyclopentanol, the latter usually being employed in a large stoichiometrical excess, is passed in the vapor phase over a hydrogenation-dehydrogenation catalyst such as copper and/or nickel on alumina, aluminum oxide, bauxite, silica, etc., copper and/or chromium on alumina, silica, etc., and the like, at elevated temperatures, usually from 160 to 250° C., and at pressures not exceeding five atmospheres absolute, to convert substantially all of the cyclopentadiene to cyclopentene with the formation of a corresponding quantity of cyclopentanone. Preferably the alcohol is present in excess in the reaction mixture and the partial pressure of the cyclopentadiene is kept low to avoid or minimize polymerization of the latter. The reaction is carried out in the vapor phase for the same reason. The cyclopentadiene functions as hydrogen acceptor for the dehydrogenation.

In the preferred mode of operation, the cyclopentene formed by the hydrogenation of cyclopentadiene and present in the reaction effluent, is continuously converted to cyclopentanol in known manner and this cyclopentanol is recycled and employed as the source of the alcohol in the conversion. In this way it is unnecessary to add the alcohol to the system once operation has been initiated.

It is preferred to use a large excess of cyclopentanol over cyclopentadiene in the feed to the catalytic conversion step. Usually the feed will not contain over 20% by weight of cyclopentadiene based on the combined weight of cyclopentadiene and cyclopentanol, the two components of the charge. In some cases the alcohol and the cyclopentadiene may be employed in amounts such as to give a molar ratio of the former to the latter of 2:1, or even as high as 1:1. In the latter case, assuming complete dehydrogenation of the alcohol to the ketone there would be just enough hydrogen available to half hydrogenate the cyclopentadiene, forming cyclopentene. However, difficulties with polymerization at these higher concentrations of cyclopentadiene generally make use of such ratios undesirable.

While it is preferred to use conditions such that the hydrogen liberated by the dehydrogenation is just sufficient to half hydrogenate the diene, in practice this result is not always exactly obtained and occasionally an excess of hydrogen is generated and this may cause hydrogenation of some cyclopentadiene completely to cyclopentane. Any cyclopentane so formed may be readily recovered as a separate fraction upon fractionation of the effluent since its boiling point is about 49–50° C.

The boiling points of the components which may be encountered in the catalytic effluent are:

| | °C. |
|---|---|
| Cyclopentanol | 156.7 |
| Cyclopentanone | 130.6 |
| Cyclopentene | 44.1 |
| Cyclopentadiene | 41.0 |

If conditions are correctly adjusted no cyclopentadiene will be found in the effluent. However, should any be found, it may be recycled as indicated optionally on the drawing.

Again, under normal operation, once the conversion has been initiated and has attained a steady state, it is unnecessary to add extraneous cyclopentanol to the feed to the conversion step. However, provision for such addition where necessary is indicated on the drawing.

In the following table are tabulated typical examples of the process of my invention. The reactor used in each example was a vertical tube containing a body of "U. O. P." non-pyrophoric nickel-kieselguhr catalyst. The reactor and catalyst were baked for several hours at a temperature above 250° C. in a stream of nitrogen before using, in order to remove the residual water in the catalyst. In each run a small amount of cyclopentanol was dehydrated by the catalyst to cyclopentene and water which appeared in the effluent. The water was recovered as a separate fraction from the effluent.

| Example | Temperature, °C. | Parts by wt. cyclopentanol | Parts by wt. cyclopentadiene |
|---|---|---|---|
| 1 | 200–240 | 86 | 66 |
| 2 | 200 | 86 | 33 |
| 3 | 200–220 | 80 | 20 |
| 4 | 160–200 | 85 | 15 |
| 5 | 200 | 90 | 10 |
| 6 | 240 | 95 | 5 |

In each case, good yields of cyclopentanone were obtained. Polymerization of the cyclopentadiene was greatly reduced as the proportion of this component in the feed was reduced from equimolar to 5% by weight of cyclopentadiene. The cyclopentene in the effluent was recovered, converted to cyclopentanol by reaction with sulfuric acid and hydrolysis, and used in further conversion. The unconverted cyclopentanol in the effluent was similarly recovered for further use.

From the foregoing it will be seen that the process of the present invention makes possible the economical and advantageous continuous conversion of readily available cyclopentadiene to cyclopentene and subsequently to valuable cyclopentanone.

I claim:

1. A process for the production of cyclopentene from cyclopentadiene without the formation of substantial amounts of cyclopentane, which comprises passing a mixture comprising cyclopentadiene and a substantially greater proportion of cyclopentanol into contact with a hydrogenation-dehydrogenation catalyst at a temperature within the range of approximately 160° to approximately 250° C. and at a superatmospheric pressure not substantially in excess of approximately 5 atmospheres absolute, and thereafter recovering cyclopentene from the resulting products.

2. A process for the production of cyclopentanone from cyclopentanol, which comprises passing a mixture comprising cyclopentanol and a smaller proportion of cyclopentadiene into contact with a hydrogenation-dehydrogenation catalyst at a temperature within the range of approximately 160° to approximately 250° C. and at a superatmospheric pressure not substantially in excess of approximately 5 atmospheres absolute, and thereafter recovering cyclopentanone from the resulting products.

3. The process of converting cyclopentadiene to cyclopentanone in a cyclic manner, which comprises passing cyclopentadiene in admixture with cyclopentanol into contact with a hydrogenation-dehydrogenation catalyst and thereby effecting simultaneous dehydrogenation of cyclopentanol to cyclopentanone and hydrogenation of cyclopentadiene to cyclopentene, recovering cyclopentanone from the effluent, also recovering cyclopentene from said effluent, converting said cyclopentene to cyclopentanol, and employing the cyclopentanol so formed in said catalytic conversion step.

4. The process of converting cyclopentadiene to cyclopentanone in a cyclic manner, which comprises passing cyclopentadiene in admixture with cyclopentanol into contact with a hydrogenation-dehydrogenation catalyst and thereby effecting simultaneous dehydrogenation of cyclopentanol to cyclopentanone and hydrogenation of cyclopentadiene to cyclopentene, recovering cyclopentanone from the effluent, also recovering cyclopentene from said effluent, converting said cyclopentene to cyclopentanol by reacting with sulfuric acid and hydrolyzing the resulting reaction product, and employing the cyclopentanol so formed in said catalytic conversion step.

5. The process as defined in claim 3, wherein the cyclopentadiene content of the feed to said catalytic conversion step is maintained at a value not exceeding 20% by weight of the total weight of cyclopentanol and cyclopentadiene in the charge, cyclopentanol making up the balance of said charge.

6. The process as defined in claim 3, wherein the cyclopentadiene content of the feed to said catalytic conversion step is maintained at a value not exceeding 20% by weight of the total weight of cyclopentanol and cyclopentadiene in the charge, cyclopentanol making up the balance of said charge, and wherein said step is carried out in the vapor phase at a temperature of from 160 to 250° C. and at a pressure not exceeding five atmospheres absolute.

7. The process of converting cyclopentadiene to cyclopentanone in a cyclic manner, which comprises passing cyclopentadiene in admixture with a large molecular excess of cyclopentanol into contact with a hydrogenation-dehydrogenation catalyst and thereby effecting simultaneous dehydrogenation of cyclopentanol to cyclopentanone and hydrogenation of cyclopentadiene to cyclopentene, fractionating the effluent to recover separate fractions of cyclopentanol, the cyclopentanone product, and cyclopentene, recycling said cyclopentanol fraction, converting said cyclopentene fraction to cyclopentanol, and recycling the cyclopentanol to said catalytic step.

8. A process for the production of cyclopentene from cyclopentadiene without the formation of substantial amounts of cyclopentane, which comprises passing in vapor phase a mixture consisting of cyclopentanol and not substantially more than approximately 20 per cent by weight of cyclopentadiene into contact with a nickel hydrogenation-dehydrogenation catalyst at a temperature within the range of approximately 160° to approximately 250° C. and at a superatmospheric pressure not substantially in excess of approximately 5 atmospheres absolute, and thereafter recovering cyclopentene from the products of the conversion.

9. A process for the production of cyclopentanone and cyclopentene from cyclopentanol and cyclopentadiene without the formation of substantial amounts of cyclopentane, which comprises passing in vapor phase a mixture consisting of cyclopentanol and not substantially more than approximately 20 per cent by weight of cyclopentadiene into contact with a nickel hydrogenation-dehydrogenation catalyst at a temperature within the range of approximately 160° to approximately 250° C. and at a superatmospheric pressure not substantially in excess of approximately 5 atmospheres absolute, thereafter recovering cyclopentene, cyclopentanone and cyclopentanol from the products of the conversion, and recirculating recovered cyclopentanol together with additional cyclopentadiene into contact with the catalyst at conversion conditions.

10. A process for the production of cyclopentanone from cyclopentadiene in a cyclic manner, which comprises passing in vapor phase a mixture consisting of cyclopentanol and not substantially more than approximately 20 per cent by weight of cyclopentadiene into contact with a nickel hydrogenation-dehydrogenation catalyst at a temperature within the range of approximately 160° to approximately 250° C. and at a superatmospheric pressure not substantially in excess of 5 atmospheres absolute, thereafter recovering cyclopentene and cyclopentanone from the products of the conversion, converting said cyclopentene to cyclopentanol and employing said cyclopentanol in said catalytic conversion step.

JAMES H. BOYD, Jr.